July 11, 1961  W. SOMMER  2,991,513
BEARING ARRANGEMENT FOR BOTTOM ROLLS
Filed Dec. 23, 1959  5 Sheets-Sheet 1

INVENTOR
Walter Sommer
By Richard Ernst
Ag't

July 11, 1961  W. SOMMER  2,991,513
BEARING ARRANGEMENT FOR BOTTOM ROLLS
Filed Dec. 23, 1959  5 Sheets-Sheet 3

INVENTOR
Walter Sommer

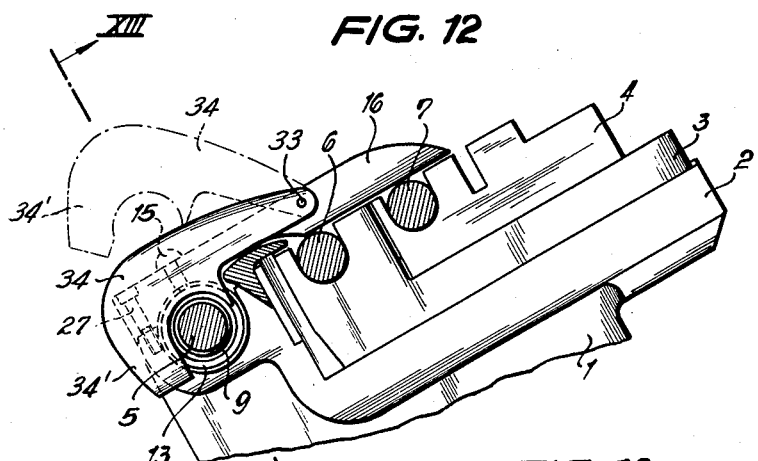
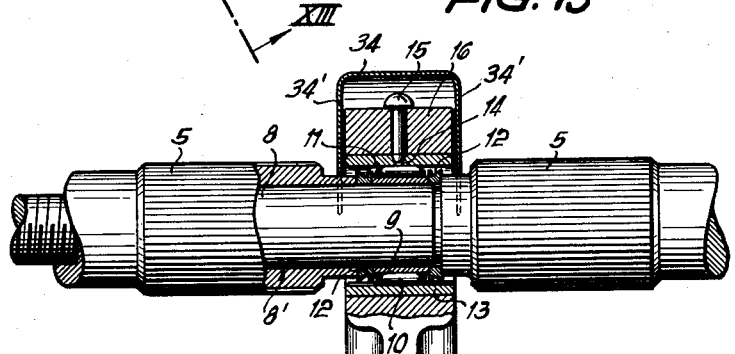
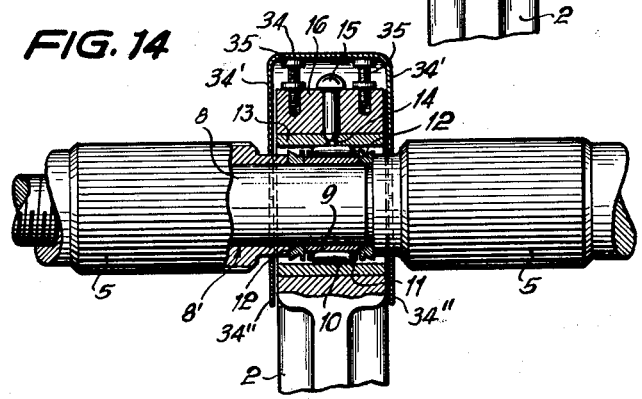

United States Patent Office 2,991,513
Patented July 11, 1961

2,991,513
BEARING ARRANGEMENT FOR BOTTOM ROLLS
Walter Sommer, Leonberg, Wurttemberg, Germany, assignor to SKF Kugellagerfabriken Gesellschaft mit beschrankter Haftung, Schweinfurt (Main), Germany, a company of Germany
Filed Dec. 23, 1959, Ser. No. 861,574
Claims priority, application Germany June 28, 1957
21 Claims. (Cl. 19—134)

This invention relates generally to drawing mechanisms for textile spinning machines, and is particularly directed to an improved bearing arrangement for the bottom rollers of such drawing mechanism.

The present application is a continuation-in-part of Serial No. 745,224, filed June 27, 1958, and now abandoned, and Serial No. 837,211, filed August 31, 1959, now abandoned.

In most existing textile drawing mechanisms, the bottom rollers thereof are mounted in sleeve bearings. Although anti-friction bearings, that is, roller, needle or ball bearings, would be desirable for the support of the bottom rollers, by reason of their longer useful life and more quiet operation, as compared with the sleeve bearings, the use of such anti-friction bearings in place of the sleeve bearings has been discouraged by reason of the difficulties encountered in sealing the anti-friction bearings to prevent the entry of fibrous fly, and thereby to avoid the necessity of frequent cleaning of the bearings. Thus, the advantage that would be obtained by the longer useful life of the anti-friction bearings is largely dissipated by the maintenance work required in effecting the frequent cleaning of such bearings so long as an effective seal therefor is not available.

In a previous attempt to employ anti-friction bearings for supporting the bottom rollers of a textile drawing mechanism, a ball bearing was provided having an outer race or external bearing ring formed of two axially separable halves held together by a single sleeve extending therearound and formed with edges which are directed radially inward towards the shaft of the related bottom rollers to cooperate with radially outward directed parts formed on the inner race of the ball bearing, thereby to define labyrinthine seals at the opposite sides of the ball bearings. However, when it is necessary to clean the described ball bearing, the entire bearing must be disassembled with the possibility that some of the bearing balls may be lost. Further, the described arrangement of the ball bearing is cumbersome and not suitable for industrial applications.

Accordingly, it is an object of the invention to provide an anti-friction bearing for the bottom rollers of a textile drawing mechanism which is constructed and arranged to permit the cleaning of the individual elements making up the bearing without requiring the disassembly thereof, and which provides a reliable sealing action against the entry of fibrous fly and the loss of lubricant.

In accordance with an aspect of the invention, an anti-friction bearing arrangement for supporting the bottom rollers of a textile drawing mechanism includes an inner ring or race mounted on the shaft of the related bottom rollers, a series of bearing elements, specifically, in the form of elongated rollers or needles, an outer bearing ring or race having a cylindrical inner surface of uniform diameter so that such outer ring can slide axially, in either direction, with respect to the remainder of the anti-friction bearing, and sealing devices at the opposite sides of the bearing each having two annular sealing parts directed radially outward toward the outer ring and dimensioned so that a small annular sealing clearance remains therebetween when the outer ring is centrally located to extend axially beyond the two sealing devices. With such an arrangement, the outer ring can be axially displaced first in one direction, and then in the other, in order to expose the sealing devices and the bearing elements, that is, the elongated rollers or needles, for permitting cleaning of the bearing without disassembly thereof.

In a preferred embodiment of the invention, the sealing portions of each sealing device provided at the opposite sides of the anti-friction bearing having different outer diameters, with the portion of each sealing device having the larger diameter being disposed at the side of the sealing device facing toward the bearing. The two sealing portions of each sealing device may be integral parts of a single annular sealing member, or such sealing portions of each sealing device may be separate from each other, for example, one sealing portion may be defined by a collar formed on the adjacent end of each of the bottom rollers, while the other sealing portion is defined by a sealing disc slidable on the shaft of the bottom rollers between the latter and the bearing. Further, at least one of the sealing portions of each sealing device may have a sharp peripheral edge in order to enhance the effectiveness of the seal in preventing the entry of fibrous fly into the interior of the bearing.

In accordance with another feature of the invention, the external ring or race of the roller bearing has a recess in its outer surface which is adapted to receive a projection extending upwardly from the related seat provided in the fixed bearing support in order to prevent rotation or axial displacement of the external ring while permitting upward removal of the bearing from the bearing support.

In accordance with a further aspect of the invention, a single cover is provided to extend over a plurality of anti-friction bearings supporting bottom rollers of the textile drawing mechanism and mounted on a common support, with such cover having openings through which the plurality of bearings may be lubricated and also having side walls which, at their edges, closely conform to the surfaces of the bottom rollers in order to improve the sealing of the bearings. Further, the single cover for the plurality of anti-friction bearings may be formed of a plurality of relatively displaceable, telescopic parts in order to permit adjustment of the spacing between the pairs of bottom rollers while the cover remains in its normal operative position.

The above, and other objects, features and advantages of the invention, will be apparent in the following detailed description of illustrative embodiments thereof which is to be read in connection with the accompanying drawings, forming a part hereof and wherein:

FIG. 12 shows an arrangement, modified in comparison with FIG. 6, in elevation;

FIG. 13 is a section on the line XIII—XIII of FIG. 12, and

FIG. 14 shows a further possible embodiment of a bearing arrangement in section.

Figure 1:
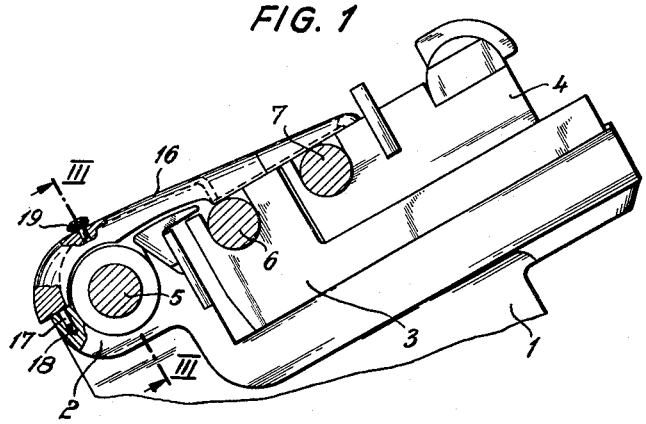
FIG. 1 is a side elevational view, partly broken away and in section, of the bottom portion of a textile drawing mechanism for spinning machines and the like, and having a bearing arrangement embodying the present invention.
Figure 2:
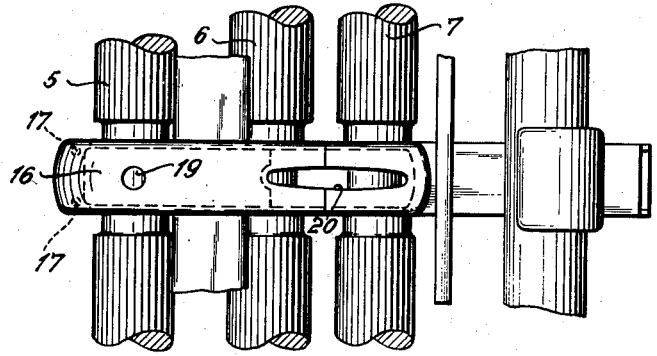
FIG. 2 is a top plan view of the structure of FIG. 1.

Referring to the drawings in detail, and initially to FIG. 1 thereof, it will be seen that a textile drawing mechanism of the kind to which the present invention relates includes a bearing support 1 which is mounted on the frame (not shown) of the associated spinning machine or the like. The bearing support 1 has an integral bearing holder 2, and additional bearing holders 3 and 4 are mounted on the support 1 and are adjustable along the latter, in a conventional manner, in order to vary the spacing between the pairs of bottom rollers 5, 6 and 7 which are mounted in the holders 2, 3 and 4, respectively.

Figure 3:
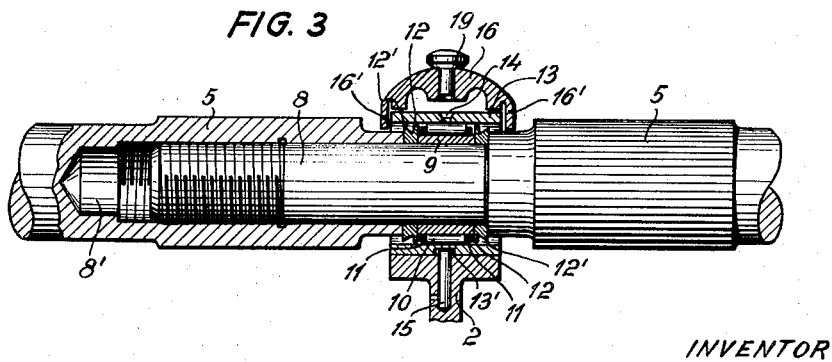
FIG. 3 is an enlarged sectional view taken along the line III—III of FIG. 1.

Referring to FIG. 3, it will be seen that the front pair of bottom rollers 5 is assembled from two sections each having a roller formed thereon. One of the sections has an axially directed pin 8 extending from one end and formed with a threaded end portion, while the other section of the assembly making up the front pair of bottom rollers 5 is formed with an axial bore 8' opening at one end to receive the pin 8 and having an internally threaded portion for threaded engagement with the threaded end portion of the pin 8.

The pin 8 and the bore 8' are axially dimensioned so that, when the threaded end portion of pin 8 is fully engaged in the threads of the bore 8', a length of the smooth surface of pin 8 will be exposed and axially limited by radially directed, annular shoulders formed at the adjacent ends of the rollers on the two sections of the assembly.

In order to rotatably support the front pair of bottom rollers 5 in the holder 2, an anti-friction bearing is seated in the holder 2 and includes an inner ring or race 9 which is slipped onto the pin 8 prior to the assembly of the two sections making up the pair of bottom rollers 5 and which is located on the exposed length of the smooth surface of pin 8, as in FIG. 3. The anti-friction elements of the bearing are in the form of elongated rollers or needles 10 which roll on the outer surface of ring or race 9 and which are axially and circumferentially located relative to each other by a cage 11.

In accordance with the present invention, the anti-friction bearing is provided with sealing devices at the opposite sides thereof and, in the embodiment illustrated in FIGS. 1 to 4, inclusive, each sealing device is in the form of an annular sealing member located on the exposed smooth surface of pin 8 between the inner ring or race 9 and the adjacent radially directed, annular shoulder formed at the end of each of the rollers of the assembly.

Each of the annular sealing members has two axially spaced apart, radially outwardly directed sealing portions 12 and 12' which preferably have different outer diameters. Thus, as shown in FIG. 3, the sealing portion 12 which is disposed next to the inner ring or race 9 of the bearing has a larger diameter than the other sealing portion 12', while the latter is formed with a sharp peripheral edge.

The anti-friction bearing rotatably supporting the front pair of bottom rollers 5 further includes an external ring or race 13 which has a cylindrical inner surface of uniform diameter against which the elongated rollers or needles 10 roll, and the outer ring or race 13 has an axial length which is substantially greater than the axial distance between the outside radial faces of the two sealing devices so that, when the outer ring 13 is axially centered with respect to the inner ring 9, as in FIG. 3, the edge portions of the outer ring 13 will substantially overlap the sealing devices in the axial direction. Further, the outer diameters of the sealing portions 12 and 12' of each of the sealing devices are selected so that a narrow circumferential gap or clearance exists between the periphery of each sealing portion 12 and the inner surface of outer ring 13 for preventing the outward leakage of lubricant, while the gap or clearance existing between the outer periphery of each sealing portion 12' and the inner surface of outer ring 13 is sufficiently small to prevent the entry of fibrous fly into the interior of the anti-friction bearing.

The outer ring 13 of the bearing is formed with an opening 14 extending radially therethrough so that lubricant can be supplied to the interior of the bearing through such opening.

Figure 4:
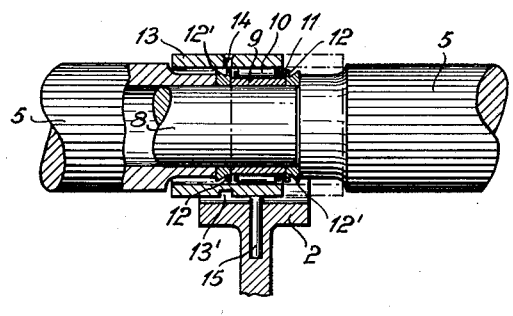
FIG. 4 is a sectional view corresponding to a portion of FIG. 3, but with the cover for the bearings removed and the external rings or race of the bearing shown in an axially displaced position in order to permit cleaning of the bearing.

In order to releasably secure the anti-friction bearing within the seat of the holder 2, the latter is provided with a pin 15 projecting upwardly into the saddle-shaped seat at the center of the latter and engageable in a radially opening recess 13' formed in the outer surface of the outer ring or race 13 of the bearing. The recess 13' is located so that, when the pin 15 engages therein, as in FIG. 3, the outer ring 13 of the bearing will be held against circumferential and axial movements relative to the holder 2 in a centered position with the lubricating opening 14 disposed at the top of the bearing. It is apparent that the pin 15 can be released from the recess 13' of ring 13 merely by lifting the anti-friction bearing relative to the holder 2, whereupon the outer ring 13 of the bearing can be displaced axially from its normal central position with respect to the inner ring or race 9 of the bearing, as shown in FIG. 4, thereby to expose the sealing device at one side of the bearing so that such sealing device may then be cleaned. Thereafter, the outer ring 13 of the bearing can be axially displaced in the opposite direction relative to the remainder of the bearing structure in order to expose the other sealing device for cleaning. The internal diameter of the outer ring is greater than the outer diameter of the adjacent annular shoulders of the rollers to permit the outer ring to slide over the shoulders, as seen in FIG. 4.

Further, in accordance with the invention, a cover 16 is provided to extend over all of the bearings mounted on the bearing support 1, and such cover 16 is provided with downwardly projecting pins 17 at its forward end adapted to be received in upwardly opening bores 18 (FIG. 1) formed in the holder 2 in order to removably secure the cover 16 in its illustrated operative position where the cover extends around the upper portion of the outer ring 13 of the needle bearing which is not enclosed within the seat of the holder 2. The cover 16 is provided with an opening aligned with the opening 14 of outer ring 13 and normally closed by a removable plug 19 so that, upon removal of plug 19, lubricant can be supplied to the opening 14 of the bearing without requiring the removal of cover 16. The cover 16 further has an elongated opening or passage 20 extending over a length thereof corresponding to the locations of the pairs of bottom rollers 6 and 7 so that lubricant can be supplied to the latter through the opening or passage 20. It will also be seen that the cover 16 has side walls 16' which extend downwardly at the opposite sides of outer ring 13 of the bearing and which have arcuate lower edges closely following the contours of the rollers 5, thereby to further promote the sealing of the anti-friction bearing.

The cover 16 preferably is formed of two or more longitudinally telescoped parts, as shown, so that such parts can be longitudinally extended or retracted in accordance with the adjustment of the holders 3 and 4 with respect to the holder 2.

Figure 5:
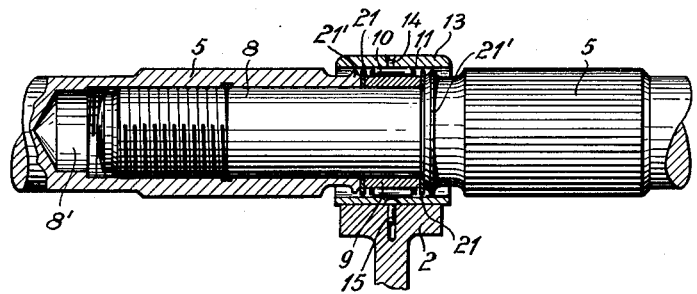
FIG. 5 is a view similar to that of FIG. 3, but illustrating another embodiment of the invention.

Referring to FIG. 5 of the drawing, it will be seen that the embodiment of the invention there illustrated is generally similar to that described above in connection with FIGS. 1 to 4, inclusive, and that the corresponding parts are identified by the same reference numerals. The embodiment of FIG. 5 differs from the previously described embodiment of the invention only in that the sealing devices at the opposite sides of the anti-friction bearing each consist of a sealing ring 21 interposed axially between an end edge of the inner ring or race 9 of the bearing to define one of the sealing portions of the sealing device, and a radially enlarged rim 21' machined on the adjacent end of each of the rollers 5 in order to define the other sealing portion of the sealing device. As is apparent in FIG. 5, the outer periphery of the sealing ring 21 has a larger diameter than the outer periphery of the rim 21' so that the small circumferential gap or clearance existing between sealing ring 21 and the inner surface of ring 13 is effective to prevent the outward leakage of lubricant, while the circumferential gap or clearance between the outer periphery of rim 21' and the inner surface of ring 13 is effective to prevent the entry of fibrous fly.

In the embodiment of FIG. 5, as in the previously described embodiment, the outer ring or race 13 of the bearing is normally centered and axially overlaps the sealing devices, as illustrated in the drawings, but may be axially displaced relative to the inner ring 9 in order to selectively expose the sealing devices for thorough cleaning thereof.

It has been found that when a seal embodying the features described is used, cleaning of the bearing from time to time is sufficient to remove the fibre fluff deposited on both sides of the sealing member, but for this purpose, the cover reaching over the bearing has to be removed, and later replaced and secured after cleaning has been effected. The removal and replacement of the covers for all the bearings on a machine occupies a relatively large amount of time. It is an additional object of the present invention to provide a bearing arrangement wherein certain cleaning can be carried out even more quickly than with apparatus of the type illustrated in FIGS. 1–5, and without much labor, and wherein the intervals between a more extensive cleaning can be considerably extended.

According to my present invention, this additional object is achieved as a result of the fact that the bearing has a cover which is provided with side walls which are movable in relation to the cover and which reach down around at least part of the circumference of the bottom roll to provide an additional sealing effect. As a result of this additional sealing effect, the greater part of the fibre fluff is intercepted before reaching the sealing members described above. It is convenient to arrange that the said side walls are formed on a U-shaped cap which engages over the cover close to the outer ring of the bearing and which may either be pivotally mounted on the cover or adapted to be frictionally held in place thereon so that accidental raising or withdrawal of the cap is impossible. The spacing of the parts of the side walls from the bottom rolls and hence the size of the seal gap may be determined by a stop which is preferably adjustably received in the bearing bracket or in the cover. Set-screws or like adjusting means may, for example, be used for this purpose.

In order to facilitate the cleaning of the individual bearing parts and to provide a simple securing means against rotation and axial displacement of the outer ring of the bearing, the cover may comprise a projection or an extension which engages in a corresponding recess in the outer ring of the bearing. In this manner the location of the outer rings of the bearings can be effected when securing the cover to the bearing bracket. Thus if the outer ring of the bearing has to be displaced in relation to the bottom roll, for example, in order to clean the whole machine, it is merely necessary to unscrew or detach the cover. On the other hand, for ordinary cleaning, it is generally sufficient to raise or withdraw the cap from the cover whereupon the dirt and fibre particles can easily be removed.

In order to render the action of the seal still more effective in relation to the penetrating fibre fluff, the side walls may be spaced apart about a central plane of the outer ring of the bearing and so completely surround the bottom roll when in their operational position. The side walls may also be divided into upper and lower portions of which the lower portions also form a cap which can be clipped in place. If desired, the lower parts of the side walls may be swung upwards on pivots on the cover or on the upper parts of the side walls. The location of the side walls in their operational position may be effected by friction or by positive locking. To facilitate manipulation of the caps, handle portions may be provided thereon which are either stamped directly out of the side walls or added thereto.

In addition to sheet metal, non-metallic materials may be used for the side walls.

Embodiments of the invention including the above-enumerated additional features are illustrated in FIGS. 6–14.

Referring firstly to FIGS. 6 to 10, it will be seen that mounted in the usual manner on the bearing support 1 are holders 2, 3, and 4 to receive the bottom rolls 5, 6, 7. As will be seen from FIG. 8, these rolls are each built up from individual parts in such a manner that a pin 8 of one part is screwed into a corresponding bore 8' in the other part. A bearing inner ring or race 9, on which needles 10 roll, is slid over the pin 8 between two parts of the bottom roll 5, 6 or 7. The bearing needles 10 are guided by a cage 11 and are surrounded by an external ring 13 which is received in the holder 2. Mounted on both sides of the inner ring 9 are sealing portions 12 which are urged against the inner ring 9 and held in position by shoulders on the two inter-connected roll parts. An opening 14 provided in the external ring 13 serves for recharging the needles 10 with lubricant.

A cover 16, which reaches over the bottom rolls 5, 6, 7, is secured by fixing screws 27 to the holder 2 or to the bearing support 1. Close to the external ring 13 of the bearing, a substantially U-shaped cap 28 is slid over the cover 16. The side walls 28' of this cap are cut away to accommodate the bottom roll 5 and reach down sufficiently to give a sealing effect. On its side walls 28', the cap has stamped out from it or added to it handle portions 28'' so that it can easily be gripped and removed from the cover 16 or pushed on it. The retention of the cap 28 in place on the cover 16 is frictionally effected by the resilience of the side walls 28' which fit closely against and grip the cover 16 or the holder 2.

Figure 10:
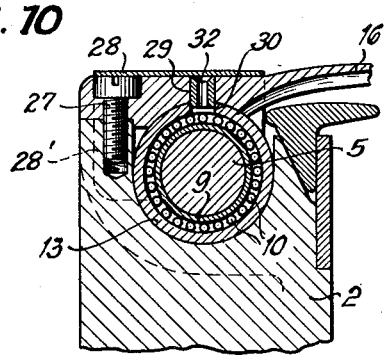
FIG. 10 is a longitudinal section through the front part of the bearing arrangement of FIG. 6, on a larger scale.
Figure 11:
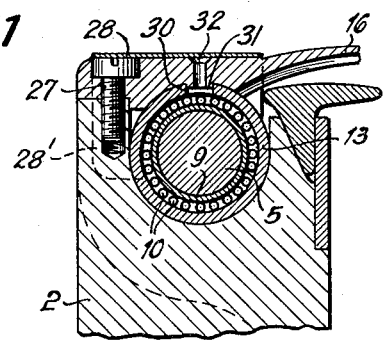
FIG. 11 shows a bearing arrangement, modified in comparison with FIG. 10, in longitudinal section.

As can be seen from FIG. 10, the cover 16 carries a pin 29 which reaches into a corresponding recess 30 in the external ring 13 and so secures the latter against twisting and axial displacement in the holder 2. Alternative locating means are shown in FIG. 11. Here, the part of the cover 16 which is situated above the external ring 13 has a projection 31 which engages in a corresponding recess 30 in the external ring 13 of the bearing. Both the pin 29 (FIG. 10) and the projection 31 (FIG. 11) may have a bore 32 for lubricating the bearing.

Another embodiment of the invention is shown in FIGS. 12 and 13 in which a cap 34 which is provided with side walls 34' is mounted on the cover 16 on a pivot pin 33. Like the cap 28, the cap 34 is cut away to accommodate the bottom roll 5 and reaches down to give a sealing effect. The cap 34 may be held in operative position on the cover by the resilience of the side walls 34' or may rest under its own weight on stops 35 illustrated in FIG. 14. These stops are shown as being constructed in the form of set-screws so that the setting of the cap 34 about its pivot may be adjusted.

Figure 6:
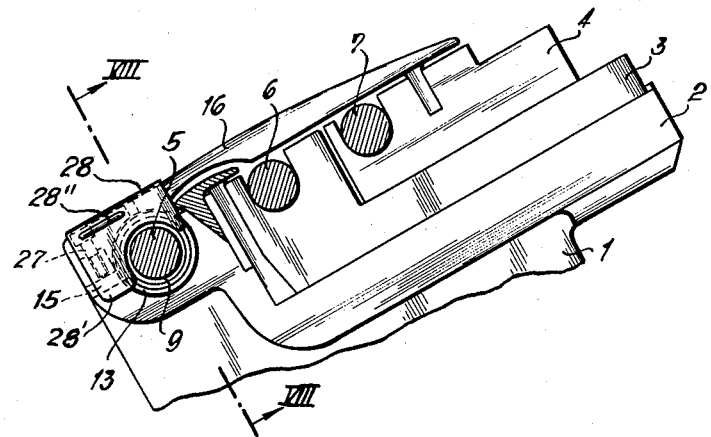
FIG. 6 shows a bottom-roll bearing arrangement, modified in comparison with FIG. 1 and illustrated in simplified form, in side elevation.
Figure 7:
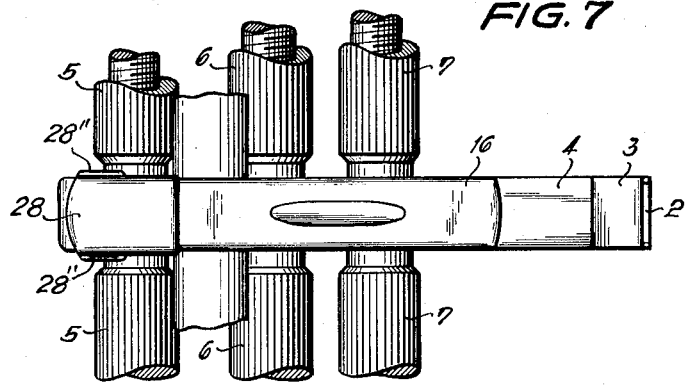
FIG. 7 is a plan view of a bottom-roll bearing arrangement according to FIG. 6.
Figure 8:
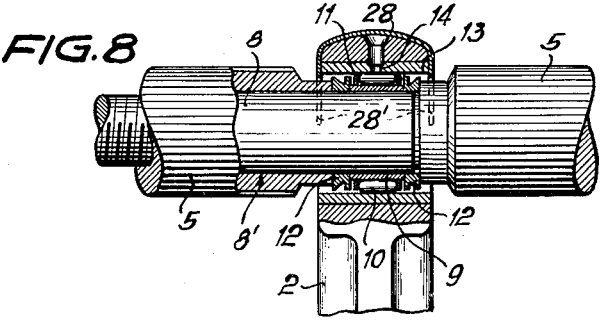
FIG. 8 is a section on the line VIII—VIII of FIG. 6 on a larger scale.
Figure 9:
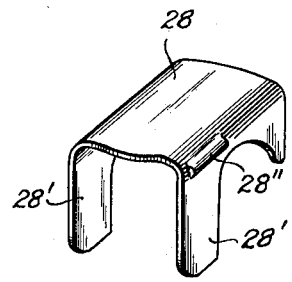
FIG. 9 shows a cap in perspective.

The securing of the external ring 13 of the bearing in the holder 2 may be effected by a cotter pin 25 (FIG. 6)

which engages in a suitable recess in the external ring 13 and this cotter pin may also be used in the construction shown in FIGS. 12–14.

In addition to the protection afforded by the side walls 34' of the cap 34, further protection may be given by another cap having side walls 34" which engage around the lower halves of the bottom roll 5 as can be seen from FIG. 14, which other cap may for example, be held in place by being put onto the holder 2. Thus the bottom roll 5 will be completely surrounded so that the sealing gap like the one formed by the sealing portions 12 will extend around the entire circumference of the roll.

The cleaning of the bearing can be carried out in a simple manner by swinging the cap 34 upwards as indicated in broken lines in FIG. 12, so that the space outside the portions 12 is accessible. The fibre fluff which has been deposited in this space can then be easily removed and after the cap 34 has been swung down again, the operational position is restored. The lower side walls 34" may, if necessary, be articulated directly to the cap 34 so that they can be swung up jointly with the upper side walls 34'.

As has already been mentioned, the embodiments illustrated are only examples of ways of carrying out the invention. The latter is not restricted thereto, and many alterations and modifications are possible. This applies not only to the mounting of the side walls 28', 34' and 34" on the cover 16 or on the holder for the bottom rolls, but also the securing of the cover 16 in place and to the locating means for the external ring of the bearing. For example, a flat on the external ring may cooperate with a corresponding flat on the cover to prevent twisting and axial displacement.

If necessary, the cover 16 and parts mounted thereon may be adapted to swing upwards to expose the outer ring of the bearing.

It will be understood that, in each of the above described embodiments of the invention, cleaning of the bearing can be effected conveniently without requiring the disassembly of the bearing or its separation from the related pair of bottom rollers. Further, while permitting such convenient cleaning of the bearings, the present invention ensures the effective sealing thereof so that the quiet running and inherent long useful life of the anti-friction bearings can be employed with advantage, and without the increased maintenance cost and time encountered in previous attempts to use anti-friction bearings for the support of the bottom rollers in textile drawing mechanisms.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. In a bearing arrangement for rotation of two members relative to each other, in combination, an inner ring mounted on one of said members; anti-friction elements rolling on the outer surface of said inner ring; an outer ring mounted on the other one of the said members, said outer ring extending around said inner ring with said anti-friction elements therebetween, said rings and said anti-friction elements constituting a bearing; sealing devices at the opposite sides of one of said rings, each having two sealing portions, said sealing portions being radially directed toward the other one of said rings and axially spaced apart, the other one of said rings having a cylindrical surface of uniform diameter facing said one ring to permit axial sliding of said other ring relative to said one ring and said sealing devices, the axial extent of said other ring being at least as great as the overall axial extent of said one ring and said sealing portions, so that, when said other ring is axially centered relative to said one ring, the opposite edge portions of said other ring extend axially over said sealing devices with said sealing portions extending radially close to said cylindrical surface of said other ring to cooperate with the latter in preventing escape of lubricant from the bearing and entry of foreign matter therein, while axial sliding of said other ring relative to said one ring selectively exposes said sealing devices to permit cleaning thereof.

2. In a drawing mechanism for spinning machines; the combination of a fixed support with upwardly opening holders receiving pairs of bottom rollers, and an anti-friction bearing for at least one of said pairs of bottom rollers adapted to seat in the related holder and including an inner ring disposed between said one pair of rollers, anti-friction elements rolling on the outer surface of said inner ring, sealing devices at the opposite sides of said inner ring each having two radially outward directed sealing portions which are axially spaced apart, and an outer ring extending around said inner ring with said anti-friction elements therebetween, said outer ring having a cylindrical inner surface of uniform diameter to permit axial sliding of said outer ring relative to said inner ring and sealing devices, the axial extent of said outer ring being substantially greater than the overall axial extent of said inner ring and said sealing devices so that, when said outer ring is axially centered relative to said inner ring, the opposite edge portions of said outer ring extend axially beyond said sealing devices with said sealing portions extending radially close to the inner surface of said outer ring to cooperate with the latter in preventing escape of lubricant from the bearing and entry of fibrous fly therein, while axial sliding of said outer ring relative to said inner ring selectively exposes said sealing devices to permit cleaning thereof.

3. In a drawing mechanism for spinning machines; the combination as in claim 2, wherein said sealing portions of each sealing device have different outer diameters with the sealing portion having the larger diameter being next to the adjacent side of said inner ring.

4. In a drawing mechanism for spinning machines; the combination as in claim 2, wherein one of said sealing portions of each sealing device consists of a sealing ring interposed axially between the adjacent side of said inner ring and the end of the adjacent bottom roller, and the other of said sealing portions is defined by a radially enlarged, annular rim on said end of the adjacent bottom roller.

5. In a drawing mechanism for spinning machines; the combination as in claim 2, wherein each sealing device is in the form of an annular sealing member having said two sealing portions as integral parts thereof and interposed axially between the adjacent side of said inner ring and the end of the adjacent bottom roller.

6. In a drawing mechanism for spinning machines; the combination as in claim 2, wherein at least one of said sealing portions of each sealing device has a sharp peripheral edge.

7. In a drawing mechanism for spinning machines; the combination as in claim 2, wherein said outer ring has a radially outward opening recess in the outer surface thereof, and further comprising a projection on said related holder to extend into said recess of the outer ring when said bearing seats in the holder for preventing axial and circumferential movement of said outer ring, so that axial sliding of said outer ring for exposing said sealing devices can be effected only after the bearing is raised to withdraw said projection from said recess.

8. In a drawing mechanism for spinning machines; the combination as in claim 2, wherein said one pair of bottom rollers includes two sections each having a roller formed thereon and a shoulder coaxial with said roller, one of said sections having an axial pin with a threaded end portion extending from the related shoulder and the other of said sections having an axial bore opening in said shoulder thereof to receive said pin and formed with an internal thread for engagement with said threaded end portion of the pin, said pin being axially dimensioned so that a portion of the length thereof between the shoulder of said one section and its threaded end portion is exposed between said shoulders to carry said inner ring of the bearing and at least a part of each of said sealing devices in abutting relationship with said shoulders, the outer diameter of said shoulders being smaller than the diameter of the cylindrical inner surface of said outer ring.

9. In a drawing mechanism for spinning machines; the combination as in claim 2, further comprising a common cover extending over the bearings of the pairs of bottom rollers received in all of said holders, said cover having openings through which the bearings can all be supplied with lubricant.

10. In a drawing mechanism for spinning machines; the combination as in claim 9, wherein said cover has depending side walls disposed laterally outside said sealing devices and having lower edges closely conforming to the contours of said rollers for further sealing said anti-friction bearing.

11. In a drawing mechanism for spinning machines; the combination as in claim 9, wherein said holders are adjustable on said support for varying the distances between said pairs of rollers, and said cover includes a plurality of longitudinally telescopic parts which are displaceable relative to each other in accordance with the adjustment of said holders on said fixed support.

12. In a drawing mechanism for spinning machines; the combination as in claim 9, further comprising a cap member of substantially U-shaped cross section having a bight portion and two leg portions spacedly extending from said bight portion, said cap member being secured to said cover, and said leg portions having lower edges closely conforming to the contours of said rollers for further sealing said anti-friction bearing.

13. In a drawing mechanism for spinning machines; the combination as in claim 12, said cap member being pivoted to said cover for arcuate movement of said lower edges toward and away from said rollers.

14. In a drawing mechanism for spinning machines; the combination as in claim 12, said cap member being frictionally secured to said cover and releasable therefrom.

15. In a drawing mechanism for spinning machines; the combination as in claim 12, said cap member being movably secured to said cover, the combination further including abutment means for abutting engagement by said cap member in a sealing position of said cap member.

16. In a drawing mechanism for spinning machines; the combination as in claim 9, further comprising a projection on said cover, said outer ring being formed with a recess, said projection radially engaging said recess for securing said outer ring against movement relative to said cover.

17. In a drawing mechanism for spinning machines; the combination as in claim 9, further comprising wall portions secured to said holder and extending therefrom toward said rollers laterally outside said sealing devices, said wall portions having upper edges closely conforming to the contours of said rollers, and depending side walls disposed laterally outside said sealing devices and having lower edges closely conforming to the contours of said rollers for further sealing said anti-friction bearing in cooperation with said wall portions.

18. In a drawing mechanism for spinning machines; the combination as in claim 17, said upper edges and said lower edges substantially extending in a plane including the axis of said outer ring, said wall portions and said side walls substantially enveloping said outer ring.

19. In a drawing mechanism for spinning machines; the combination as in claim 17, said wall portions being integrally connected to form an additional cap member releasably secured to said holder.

20. In a drawing mechanism for spinning machines; the combination as in claim 9, wherein said cover has depending side walls disposed laterally outside said sealing devices and having lower edges closely conforming to the contours of said rollers for further sealing said anti-friction bearing, said combination further comprising wall portions pivotably secured to said cover and having each an edge portion closely conforming to the contours of said rollers and sealingly engageable therewith by pivoting movement relative to said cover for further sealing said anti-friction bearing in cooperation with said lower edges of said side walls.

21. In a drawing mechanism for spinning machines; the combination as in claim 20, wherein said wall portions are pivotally secured to said side walls.

References Cited in the file of this patent

UNITED STATES PATENTS

| | | |
|---|---|---|
| 2,592,718 | McGhee | Apr. 15, 1952 |
| 2,749,574 | Pray | June 12, 1956 |